Patented Apr. 29, 1941

2,240,033

UNITED STATES PATENT OFFICE 2,240,033

WELD ROD AND COATING THEREFOR

Arthur T. Cape and Charles V. Foerster, Jr., Santa Cruz, Calif.

No Drawing. Application February 20, 1939, Serial No. 257,474

6 Claims. (Cl. 148—23)

This invention relates to weld rods and coatings therefor, but has reference more particularly to the use of various coatings for securing various degrees of hardness in the welded deposits.

In our co-pending application, Serial No. 228,528, filed September 6, 1938, we have disclosed a series of ferrous alloys which are especially adapted for hard-facing purposes and for direct utilization in the form of castings, these ferrous alloys being characterized by high resistance to wear and abrasion, to heavy and repeated impacts, to chemical corrosion, to oxidation at high temperatures, and possessing strength at high temperatures. It was also disclosed that these alloys possess the quality of being capable of forming a sound bond with the base metal, and that they have a viscosity in the molten condition, such as to permit easy application of the alloys to the base metal.

The ferrous alloys under consideration contain, in general, from about 3% to about 5% carbon, nickel in appreciable amounts up to about 10% and chromium in amounts of from about 3% to about 30%, the remainder of the alloy being substantially iron.

In some cases, in order to produce resistance to oxidation at high temperatures in the aforesaid basic alloys, molybdenum in amounts of from about 6% to about 10% is added, and one alloy in this group, containing about 4% carbon, about 16% chromium, about 2% nickel, about 8% molybdenum and about 1% vanadium, is particularly valuable in the form of welding rods for hard-facing applications, where high temperatures are encountered or where considerable "edge" strength is required. The vanadium, which may be added in quantities of from about .20% to about 1%, apparently imparts to the alloy increased toughness, and in the welding rod, a degree of "stickability," which is definitely advantageous. This term defines the property or ability of the weld metal, deposited by the melting welding rod, to resist separation from the base metal, under severe impact.

In other cases, silicon in appreciable amounts up to about 5.5%, is added to the aforesaid basic alloys, to produce increased hardness in the "as-cast" state, and extreme hardness and extremely high wear resistance in the "as-welded" state. Titanium, in amounts up to about 1%, is added to secure increased abrasion resistance.

In the manufacture of the aforesaid alloys, it is desirable to produce sound castings or good welding material. For this purpose, the original charge in the furnace must be kept free from silicon, or as reasonably low in silicon as is possible, and also free from titanium. Additions of silicon and titanium should be made as close to the end of the melting operations as possible. If these conditions are not observed, the material, whether used as castings or as acetylene welding rods, is porous. For arc welding, these factors are not quite as important, because the gases present in the welding rod are removed during the arc welding process.

In order to control the arc action, the hardness, and other properties of weld rods made from the aforesaid alloys, we apply to the weld rods coatings containing plumbago or graphite.

To obtain a coating which will produce a relatively soft deposit, we employ a mixture of plumbago and sodium silicate, to which Bentonite is sometimes added. The sodium silicate is effective to hold the plumbago in place, while the Bentonite is effective to improve the physical strength of the coating. The relative amounts of these ingredients varies in accordance with the state of the plumbago used and also to some extent on atmospheric conditions. To obtain a coating which will produce a relatively hard deposit, we employ a mixture of graphite, usually in the form of crushed arc furnace electrodes, and sodium silicate, to which Bentonite is sometimes added.

By the selective use of these coatings, differences as great as 30 Rockwell C to 55 Rockwell C can be produced in the deposits.

The normal mixtures employed in these coatings are as follows, the rods being coated simply by dipping them in the mixture and drying them:

| Soft coat | Grams | Hard coat | Grams |
|---|---|---|---|
| Plumbago | 3000 | Graphite | 3000 |
| Sodium silicate | 2600 | Sodium silicate | 1800 |
| Bentonite | 90 | Bentonite | 90 |
| Water | 950 | Water | 1290 |

Although the use of the aforesaid coatings has been described as advantageous particularly in connection with the manufacture of weld rods of chromium-nickel ferrous alloys, their use contributes like advantages to weld rods of other ferrous alloys as well as plain carbon steel, and it is to be understood therefore that the invention is not restricted except as noted in the appended claims.

This application is a continuation-in-part of our copending application, Serial No. 228,528.

We claim:

1. A mixture for coating weld rods, said mixture containing 15 parts of plumbago and 13 parts of sodium silicate.

2. A mixture for coating weld rods, said mixture containing graphite and sodium silicate in the relative proportions of five to three.

3. A mixture for coating weld rods, said mixture containing by weight:

| | Parts |
|---|---|
| Plumbago | 3000 |
| Sodium silicate | 2600 |
| Bentonite | 90 |
| Water | 950 |

4. A mixture for coating weld rods, said mixture containing by weight:

| | Parts |
|---|---|
| Graphite | 3000 |
| Sodium silicate | 1800 |
| Bentonite | 90 |
| Water | 1290 |

5. A mixture for coating weld rods, said mixture containing plumbago and sodium silicate in major proportion and Bentonite in minor proportion.

6. A mixture for coating weld rods, said mixture containing graphite and sodium silicate in major proportion and Bentonite in minor proportion.

ARTHUR T. CAPE.
CHARLES V. FOERSTER, Jr.